United States Patent
Korenwaitz et al.

(10) Patent No.: US 12,022,292 B2
(45) Date of Patent: Jun. 25, 2024

(54) PARTIAL LIMITATION OF A MOBILE NETWORK DEVICE

(71) Applicant: NETSPARK LTD., Giva't Shmu'el (IL)

(72) Inventors: Elyasaf Korenwaitz, Elon Moreh (IL); Yuval Levitas, Ramat Gan (IL); Zvi Bazak, Jerusalem (IL)

(*) Notice: Subject to any disclaimer, the term of this patent is extended or adjusted under 35 U.S.C. 154(b) by 444 days.

(21) Appl. No.: 17/423,928

(22) PCT Filed: Feb. 27, 2020

(86) PCT No.: PCT/IL2020/050226
§ 371 (c)(1),
(2) Date: Jul. 19, 2021

(87) PCT Pub. No.: WO2020/208624
PCT Pub. Date: Oct. 15, 2020

(65) Prior Publication Data
US 2022/0086649 A1    Mar. 17, 2022

Related U.S. Application Data

(60) Provisional application No. 62/832,288, filed on Apr. 11, 2019.

(51) Int. Cl.
*H04W 12/088* (2021.01)
(52) U.S. Cl.
CPC ............... *H04W 12/088* (2021.01)

(58) Field of Classification Search
CPC .... H04W 12/088; G06F 21/53; G06F 21/629; H04L 63/0227
See application file for complete search history.

(56) References Cited

U.S. PATENT DOCUMENTS

| | | | |
|---|---|---|---|
| 8,490,176 B2 | 7/2013 | Book et al. | |
| 9,912,664 B1* | 3/2018 | Lam | H04L 63/10 |
| 2004/0003279 A1 | 1/2004 | Beilinson et al. | |
| 2011/0010466 A1* | 1/2011 | Fan | H04N 21/26283 709/246 |
| 2015/0032887 A1 | 1/2015 | Psek et al. | |
| 2016/0164894 A1* | 6/2016 | Zeitlin | H04L 63/1416 726/23 |
| 2017/0149795 A1 | 5/2017 | Day, II | |

* cited by examiner

*Primary Examiner* — Beemnet W Dada

(57) ABSTRACT

In some embodiments, a local user is prevented from accessing certain content and/or capabilities of a mobile network device while allowing him control over other functions of the device. For example, an administrator may prevent certain undesired activities. Optionally, by means of an MDM server and/or a remote server, the local user controls other aspects of his device as he wills More specifically but not exclusively the method works on IOS devices. An aspect of some embodiments of the current invention relates to a method of selecting a level of filtering for individual members of a network and/or packets. Optionally, a device pertinent to aggressive filtering may signal to the server and/or other devices will be less aggressively filtered. Alternatively or additionally, a server may determine from certain behaviors and/or packet characteristics that a device and/or packet should be filtered aggressively or not.

11 Claims, 16 Drawing Sheets

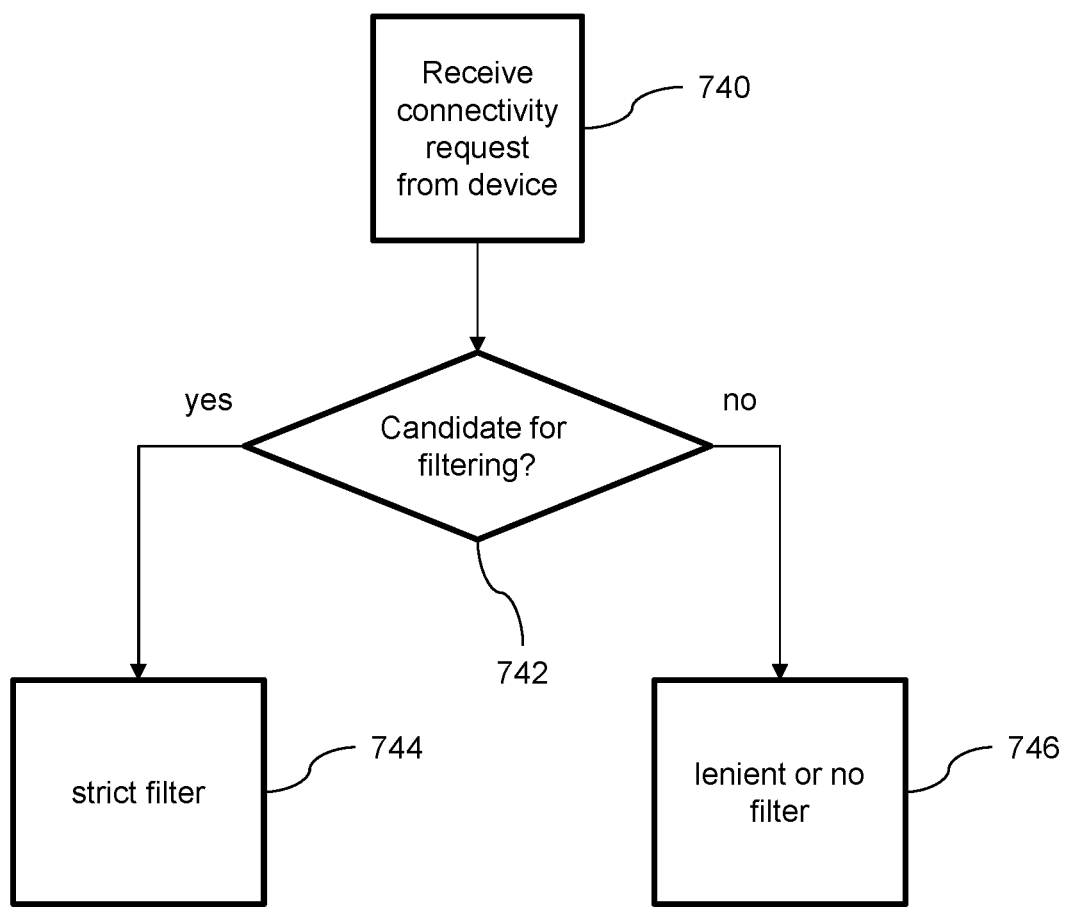

PARTIAL LIMITATION OF A MOBILE NETWORK DEVICE

RELATED APPLICATION/S

This application claims the benefit of priority under 35 USC § 119(e) of U.S. Provisional Patent Application No. 62/832,288 filed Apr. 11, 2019, the contents of which are incorporated herein by reference in their entirety.

FIELD AND BACKGROUND OF THE INVENTION

The present invention, in some embodiments thereof, relates to a method to limit use of a mobile network device and, more particularly, but not exclusively, to a method to prevent a local user from accessing freely available content while giving him limited control of the device.

The present invention, in some embodiments thereof, relates to a method to apply different levels of filtering on a network.

U.S. Published Patent Application no. 20170149795 appears to disclose, that "Devices, systems, and methods for allowing parents to view and track smart phone activities of their children can include one or more child software modules. The module can be installed on each child's smart phone. The module can access and extract data from or about more than one of the smart phone's other software applications, including at least two of the following: a texting application, a social media application, an image application that facilitates transmission or reception of images, and a web browser application. The module can further send the extracted data to an analysis server. The module can also monitor location data. Moreover, the system can include an analysis server that can identify potentially harmful language, images, and websites. Further, the system can include a parent portal. The parent portal can receive results from the analysis server.

U.S. Published Patent Application no. 20150032887 appears to disclose that a, "control application executed on a target mobile device monitors applications used on the target mobile device and reports the monitored usage to a monitoring device. The control application receives access restrictions from the monitoring device, where each access restriction specifies a condition defined by a first user for causing the target mobile device to take an action restricting use of the target mobile device by a second user. If the control application detects satisfying of the condition specified by an access restriction, the control application enforces the access restriction at the target mobile device by taking the action specified by the access restriction to restrict the user of the target mobile device by the second user."

SUMMARY OF THE INVENTION

According to an aspect of some embodiments of the invention, there is provided a method of limiting access of a local user to a mobile network device including: installing mobile device management MDM onto the device to allow a remote server to removal of an application from the device; preventing a local user from using a local user interface removing the application; installing an application interface on the device to request that the remote server disable the application upon request from the local user.

According to some embodiments of the invention, the preventing includes preventing a local user from using a local user interface for removing any application from the device.

According to some embodiments of the invention, the method further includes: configuring the remote server for removing by the remote server of a first application from the device in response to a request from the local user using the interface and refusing a request from the local user for removing a second application from the device.

According to some embodiments of the invention, the method further includes: installing a filtering application onto the device that inhibits access by the local user to at least one content from a network; and refusing by the remote server to uninstall the filtering application.

According to an aspect of some embodiments of the invention, there is provided a method of limiting use of a programmable device including: preventing a local user from using a local user interface removing a first application or a second application from the device via a local user interface of the device; removing the first application from the device via a remote server using MDM in response to the local user requesting removal of the first application through an interface of the device; refusing to disable the second application from the device in response to the local user requesting removal of the second application through the interface of the device.

According to an aspect of some embodiments of the invention, there is provided a system for providing limited access to a local user to a network device including: a first application and a second application actively running on the device; a locking application associated with an operating system of the device preventing the user from disabling the first application or the second application; a remote server accessible to the network device over a network; an MDM server allowing access to a remote server to the device to disable at least the first application; a user interface on the device configured for relaying a request by local user to disable the first application to the remote server.

According to some embodiments of the invention, the system further includes: an instruction stored on a non-volatile memory preventing the user from disabling the second application by instructing the remote server.

According to an aspect of some embodiments of the invention, there is provided a system for providing different levels of filtering to different members of a network including: a network server configured to receive a signal, provide a first level of filtering to a device upon receiving a signal of a willingness to be filtered from the device, and provide a second level of filtering to a device from which the server did not receive the signal; a signaling module installed on a first member of the network, the module transmitting the signal to the network server; a second member of the network not including the signaling module.

According to some embodiments of the invention, the network server is configured to open an SSL/TLS packet coming to the first member and to not open an SSL/TLS packet coming to the second member.

According to some embodiments of the invention, the signaling module is configured for sending the signal in a manner that does not interrupt a standard network server.

According to some embodiments of the invention, the signaling module is configured to send the signal via at least one method selected from the group consisting of including an identifiable value in a field of a packet header, including an identifiable value in a field of an IPv4 packet header, including an identifiable value in a DSCP field of a packet header, making a legal but very unlikely change in a communicated data and making a legal very unlikely change in a handshake communicated data.

According to some embodiments of the invention, the server is further configured to apply a different level of a filtering to different connection requests.

According to an aspect of some embodiments of the invention, there is provided a method for providing different levels of filtering to different devices including: receiving a signal from a first device that is ready to receive filtered content, filtering content delivered to the first device at a first level, and providing content to a second device that from which the signal was not received with less strict filtering than the first level.

According to some embodiments of the invention, the first level of filtering includes opening an SSL/TLS packet when it is sent to the first device and the less strict filtering includes not opening the SSL/TLS packet when it is sent to the second device.

According to some embodiments of the invention, the method further includes sending the signal by the first device in a manner that does not interrupt a standard network server.

According to some embodiments of the invention, sending the signal includes at least one method selected from the group consisting of including an identifiable value in a field of a packet header, including an identifiable value in a field of an IPv4 packet header, including an identifiable value in a DSCP field of a packet header, making a legal but very unlikely change in a communicated data, dividing a data packet and making an unlikely legal change in a handshake communicated data.

According to some embodiments of the invention, the method further includes applying a higher level of a filtering to a first connection request from the first device and a lower level of filtering to a second connection request from the first device.

According to some embodiments of the invention, the method further includes: estimating a source of a connection request and selecting between a high and low level of filtering for the connection request in response to the estimating.

According to some embodiments of the invention, the method further includes determining that a first connection request is from a web browser and filtering the first connection at a higher level and determining a second connection request is from a financial application and filtering second connection at a lower level.

According to an aspect of some embodiments of the invention, there is provided a system for signaling a readiness for filtering of a member of a network as illustrated in the above disclosure.

According to an aspect of some embodiments of the invention, there is provided a method for signaling a readiness for filtering of a member of a network as illustrated in the above disclosure.

According to an aspect of some embodiments of the invention, there is provided a method of limiting access of a local user to a mobile network device as illustrated in the above disclosure.

According to an aspect of some embodiments of the invention, there is provided a system for providing limited access to a local user to a mobile network device as illustrated in the above disclosure.

According to an aspect of some embodiments of the invention, there is provided a system for providing different levels of filtering to different members of a network as illustrated in the above disclosure.

According to an aspect of some embodiments of the invention, there is provided a method for providing different levels of filtering to different members of a network as illustrated in the above disclosure.

According to an aspect of some embodiments of the invention, there is provided a system for signaling a readiness for filtering of a member of a network as illustrated in the above disclosure.

According to an aspect of some embodiments of the invention, there is provided a method for signaling a readiness for filtering of a member of a network as illustrated in the above disclosure.

According to an aspect of some embodiments of the invention, there is provided a system for providing different levels of filtering to different connectivity requests as illustrated in the above disclosure.

According to an aspect of some embodiments of the invention, there is provided a method for providing different levels of filtering to different connectivity requests as illustrated in the above disclosure.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks might be expected to use completely different methods, e.g., making use of expert knowledge and/or the pattern recognition capabilities of the human brain, which would be vastly more efficient than manually going through the steps of the methods described herein.

Data and/or program code may be accessed and/or shared over a network, for example the Internet. For example, data may be shared and/or accessed using a social network. A processor may include remote processing capabilities for example available over a network (e.g. the Internet). For example, resources may be accessed via cloud computing. The term "cloud computing" refers to the use of computational resources that are available remotely over a public network, such as the internet, and that may be provided for example at a low cost and/or on an hourly basis. Any virtual or physical computer that is in electronic communication with such a public network could potentially be available as a computational resource. To provide computational resources via the cloud network on a secure basis, computers that access the cloud network may employ standard security encryption protocols such as SSL and PGP, which are well known in the industry.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 7 is a flow chart illustration of a server selectively filtering devices on a network in accordance with an embodiment of the current invention;

DESCRIPTION OF SPECIFIC EMBODIMENTS OF THE INVENTION

Figure 1:
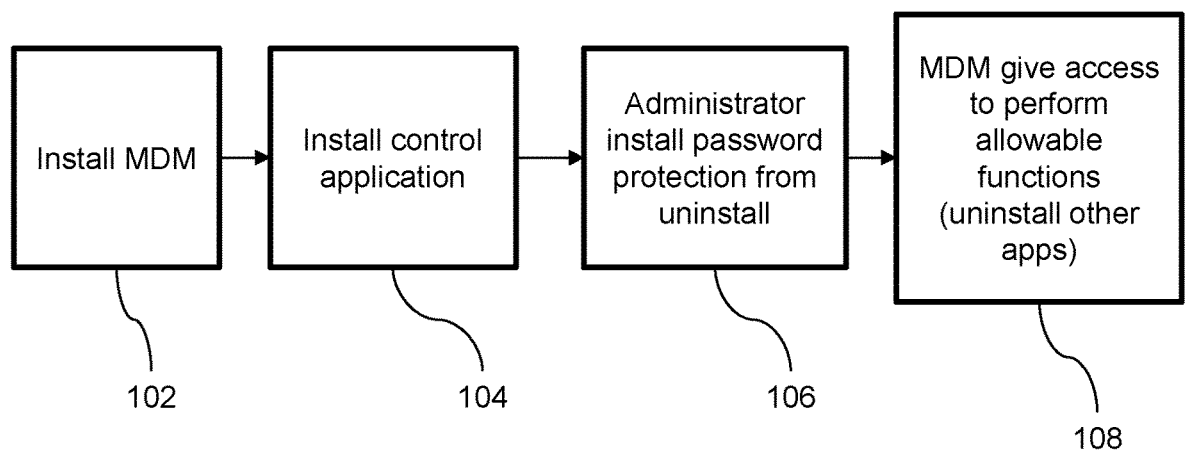
FIG. 1 is a flow chart illustration of a method of limiting access of a mobile network device in accordance with an embodiment of the current invention.

The present invention, in some embodiments thereof, relates to a method to limit use of a mobile network device and, more particularly, but not exclusively, to a method to prevent a local user from accessing freely available content while giving him limited control of the device.

The present invention, in some embodiments thereof, relates to a method to apply different levels of filtering to different devices and/or different connectivity requests from a device on a network.

Overview

An aspect of some embodiments of the current invention relates to preventing a local user from access certain content and/or capabilities of a mobile network device while allowing him control over other functions of the device. For example, an administrator (e.g. a parent) may install an application on the device that prevents certain undesired activities and/or prevent a local user from uninstalling and/or disabling that application. Optionally, at the same time the local user controls other aspects of his device as he wills (e.g. installs and/or uninstalls other applications). Optionally, the protection can be installed to an existing device without losing data and/or set up options of the device. More specifically but not exclusively the method works on IOS devices (e.g. iPhone).

An aspect of some embodiments of the current invention relates to a method of selecting a level of filtering for individual members of a network. In some embodiments, certain devices may not be pertinent to aggressive filtering, for example some devices require direct connection and/or secure connection to a particular Internet server and/or some device are autonomous (have no human user to protect from pornography or violence). Optionally, a filtering server detects devices that are pertinent to aggressive filtering and/or devices that are not pertinent to aggressive filtering. For example, a device pertinent to aggressive filtering may signal to the server that it should be aggressively filtered and/or other devices will be less aggressively filtered. Alternatively or additionally, a server may determine from certain behaviors that a device should be filtered aggressively or not. Alternatively or additionally, a server may allow direct and/or secure connections to certain servers and/or certain functions with reduced interference.

An aspect of some embodiments of the current invention relates to selective filtering of traffic through a network. In some embodiments, a filtering server intercepts packets of data into, out of and/or inside a network. Optionally, the server opens and repackages some packets and/or delivers other packets un-touched. For example, the server may open and repackage some or all packets of a compliant device. For example, the compliant device may signal to the network its compliance. In some embodiments, a signal is added by the compliant device to each connection request and/or non-conditionally and/or without knowledge of whether the network is compliant to the signaling. Optionally, the signal is sent in such a way that it does not interfere with communication when the compliant device is using a standard and/or non-compliant network. In some embodiments a filtering server may filter, open and/or repackage all, some and/or none of packets of a non-compliant device. In some embodiments, whether the filtering server filters and/or opens and/or repackages a packet and/or the level and/or kind of filtering will depend on whether and/or what kind of signal is sent by the device and/or the historical behavior of the device and/or other factors about the packet.

Detailed Embodiments

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1 is a flow chart illustration of a method of limiting access of a mobile network device (for example a smartphone and more particularly but not exclusively an IOS device such as an iPhone) in accordance with an embodiment of the current invention. In some embodiments, an administrator may install 106 onto a mobile network device an access limiting system that allows a local user limited control over the device. For example, local user will be allowed to disable some applications (for example by removing them from the device). Optionally, the access limiting system may be installed 106 without resetting the device. For example, the administrator may install 106 password protection preventing the local user from making certain changes, for example removing applications from the device. Additionally or alternatively, mobile device management (MDM) and/or an MDM profile may be installed 104 on the device, for example allowing 102 a remote server to install and/or disable applications from the device. Additionally or alternatively, a control application may be installed 104 on the device that controls fulfilling of requests of the user for certain functions for example by routing those requests to the remote device which performs 108 the functions.

In some embodiments, a request to perform a function that was prevented by the password protection may be directed to the remote server. Optionally the remote server performs 108 and/or refuses to perform the requested function in accordance with programed instructions of the administrator. Optionally the local user will be prevented from disabling the control application. Additionally or alternatively, the control application will direct Internet access requests through a virtual private network (VPN) and/or a filtering server. For example, a control application may direct certain commands through a centralized network server (e.g. the MDM server and/or the remote server) to a VPN server and/or a stipulated proprietary server. Alternatively or additionally, Internet access may be directed and/or controlled via a proxy profile.

For example, an administrator may limit an IOS device in accordance with the current invention. For example, an administrator may install 104 a control application (e.g. Netspark from the Apple AppStore). Optionally the control application may install 102 an MDM profile onto the device. Alternatively or additionally, a device administrator may install MDM. Additionally or alternatively, the control application and or the MDM may install a VPN and/or turn on the VPN and/or install a proxy profile. Additionally and/or alternatively, the control application may instruct the administrator to set up device limitations. For example, the control application may direct the administrator to install 106 IOS restrictions (for example password protection for local removing of applications). For example, the password protection may prevent local disabling of any application without the password.

Figure 2:
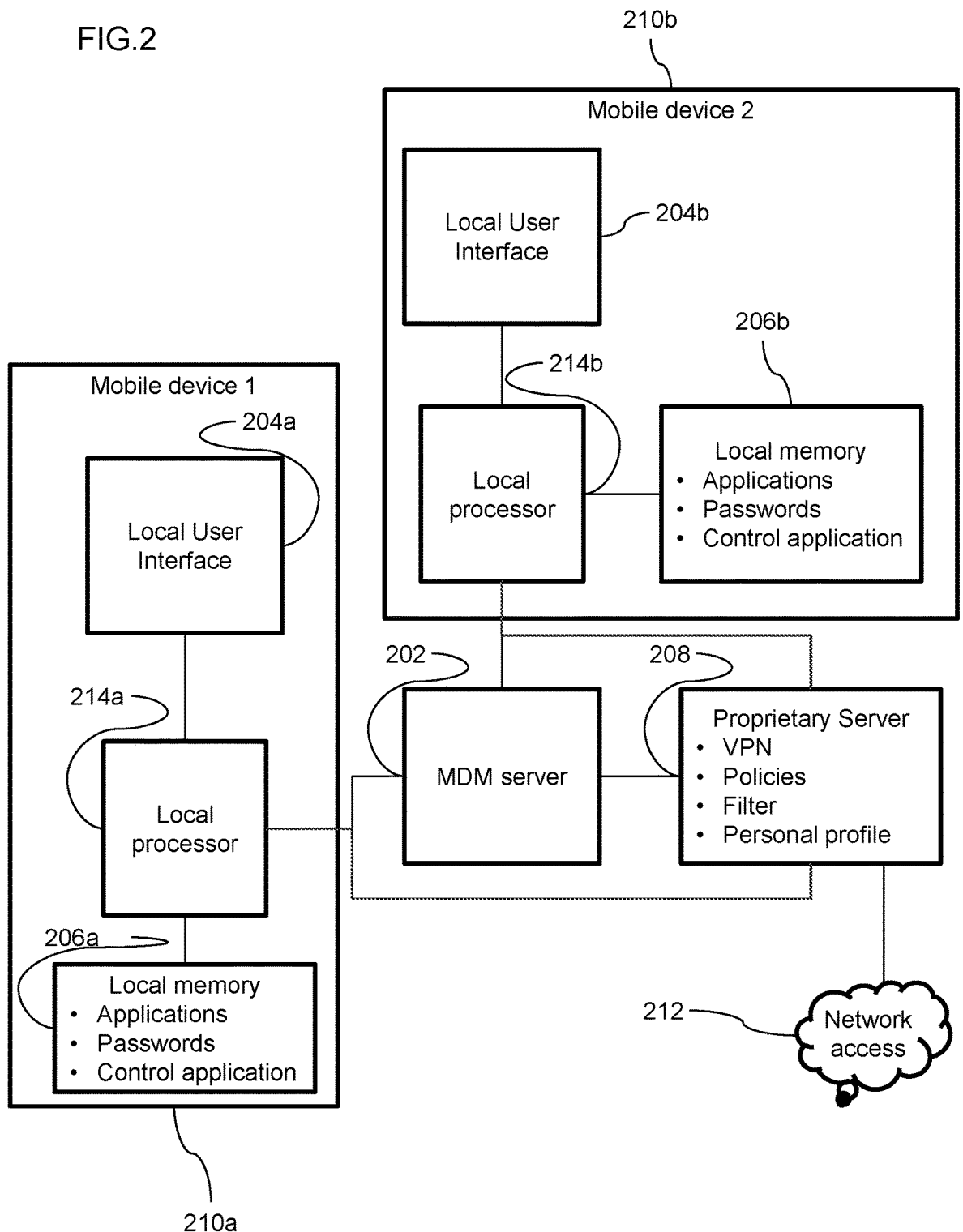
FIG. 2 is a block diagram of a system for limiting access of a mobile network device in accordance with an embodiment of the current invention.

FIG. 2 is a block diagram of a system for limiting access of a mobile network device in accordance with an embodiment of the current invention. For example, the system of FIG. 2 may be used to perform all and/or part of the method described in FIG. 1. In some embodiments, one or more mobile network devices 210a, 210b (for example an iPhone) may include a local processor 214a, 214b and/or a local memory 206a, 206b and/or a user interface 204a, 204b. Optionally, the local processor 214a may store and/or retrieve data from the local memory 206a. For example, the local memory 206a may include an operating system (e.g. IOS) and/or a control program and/or other applications and/or encryption routines protecting data and/or applications. Optionally, the device is connected to a network 212 via a centralized server (for example a proprietary server 208 and/or an MDM server 202). Optionally, the MDM server 202 sends a VPN profile to the device to connect the device to a VPN and/or a proprietary server 208. For example, the VPN may control incoming data and/or applications according to a specification of the administrator. For example, the VPN and/or proprietary server 208 may filter violence, pornography and the like from the device. Optionally connection between different devices will pass through the MDM server 202 and/or the proprietary server 208. For example, the MDM server 202 and/or the proprietary server 208 will facilitate communication/control between two mobile devices. For example, in order to read data from another mobile device, MDM server 202 and/or the proprietary server 208 is used to pass the read/write commands. Additionally and/or alternatively, a proprietary server 208 and/or a separate VPN server may control a group of mobile devices optionally control may be mediated by the MDM server 202.

Figure 3:
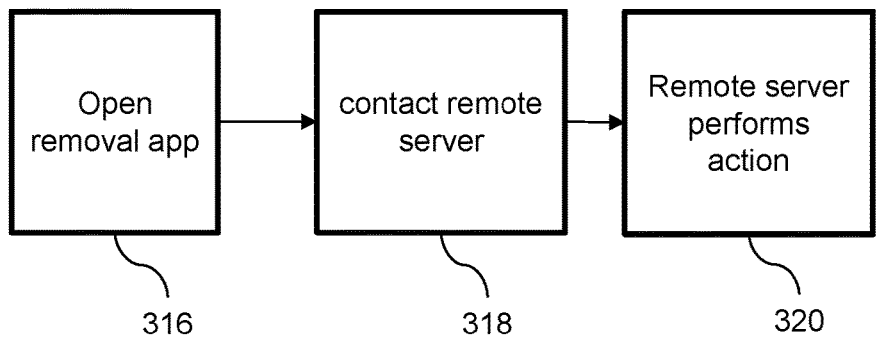
FIG. 3 is a flow chart illustration of a method of removing an application from a limited access mobile network device in accordance with an embodiment of the current invention.

FIG. 3 is a flow chart illustration of a method of removing an application from a limited access mobile network device in accordance with an embodiment of the current invention. For example, a local user may not know a password that allows removal of applications locally. Optionally, a removal application (for example a function of a control program) supplies an interface for the user to disable programs. The local user opens 316 the removal application and/or gives a command to disable a particular program. Optionally, the removal application passes 318 the disable request to the MDM server and/or to an external proprietary server (e.g. the VPN server and/or a filtering server). According to the request of the user and/or in accordance with the MDM profile and/or according to rules stored on the propriety server (for example rules set up by the mobile device administrator) the proprietary server and/or the MDM server performs 320 an action, (for example, disabling the application and/or refusing to disable the application and/or changing settings on the mobile device and/or notifying an administrator etc.).

Figure 4:
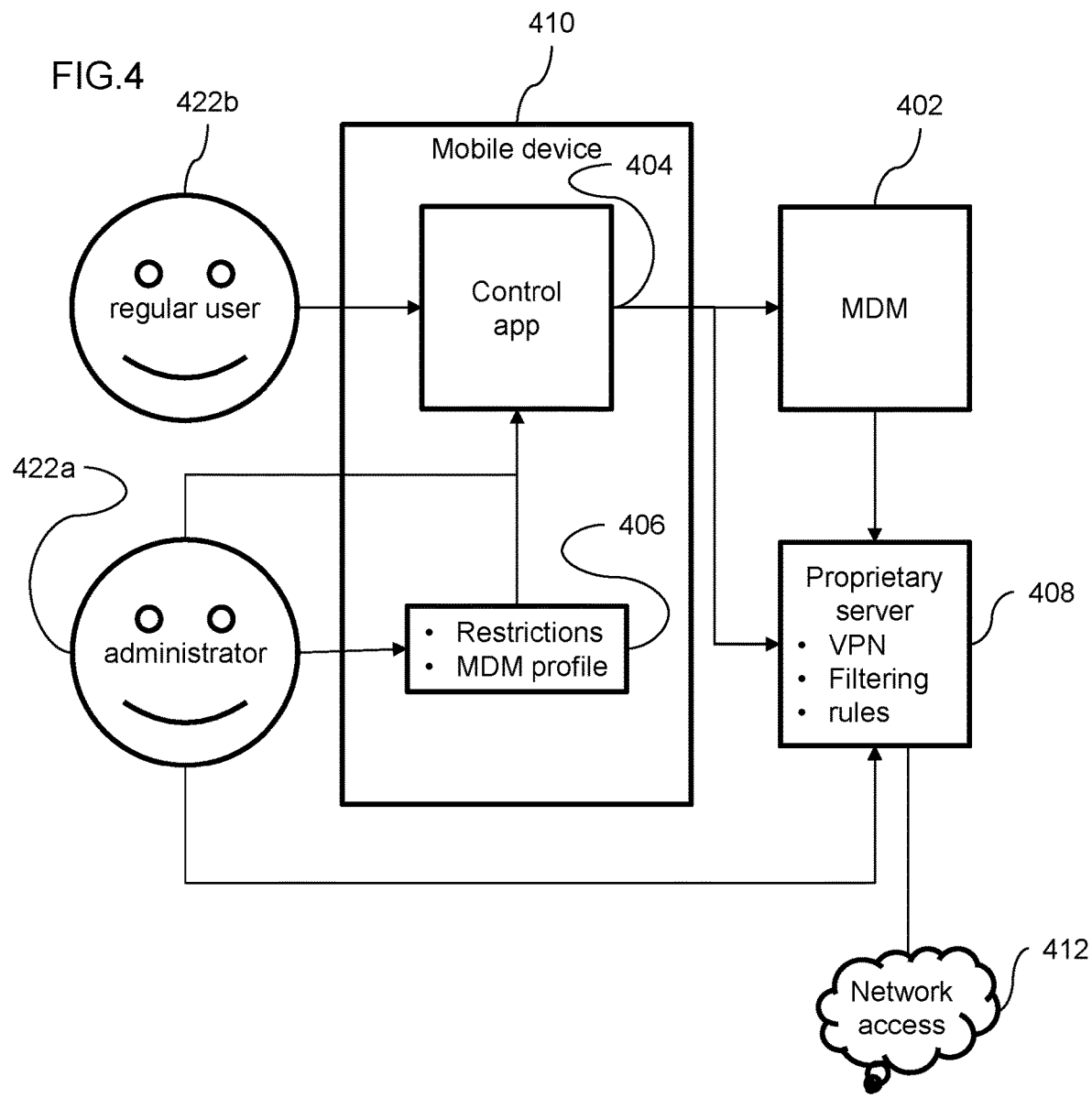
FIG. 4 is a schematic illustration of division of control of a limited access mobile network device in accordance with an embodiment of the current invention.

FIG. 4 is a schematic illustration of division of control of a limited access mobile network device 410 in accordance with an embodiment of the current invention. Optionally, an administrator 422a controls restrictions on the device 410 (for example, access 412 to local changes in device 410 restrictions may require a password and/or bio-identification that is limited to the administrator 422a). In some embodiments, local restrictions may lack flexibility. For example, it may be difficult for an administrator 422a to use local restrictions to prevent a user 422b from disabling a control program while allowing him to remove and/or disable other programs. Optionally, the administrator 422a may use local restrictions 406 to lock functions of the phone that he wants to control and/or also functions that he wants to allow the local user 422b to control. Optionally those functions that he wants the local user 422b to control will be relegated to remote control (for example by a proprietary server 408). For example, remote control may be mediated by an MDM server. Optionally, the local user 422b will be supplied with an interface 404 to make requests to perform those functions via MDM. For example, the administrator 422a may restrict the local user 422b from removing any programs from the device 410 and/or allow the remote server to disable certain applications and/or supply an interface 404 (for example as part of a control program) to disable any program except the control application. Alternatively or additionally, the local user 422b may be restricted from changing settings of the device 410, but may be given access via MDM to change some settings. Additionally or alternatively, the local user 422b may be restricted from changing the MDM profile. Additionally or alternatively, the local user 422b may be restricted accessing an external device except via the proprietary server 408. Optionally, the administrator 422a may be able to adjust the restrictions and/or the proprietary server 408 and/or the MDM profile. For example, the administrator 422a may have access to the proprietary server 408 via an interface on the mobile device (the interface may optionally require identification e.g. a password and/or bio-identification) and/or through the MDM 402 and/or through an external device. In some embodiments, if the local user 422b gains control over the MDM connection 402 (e.g. he can shut off MDM control over the phone) he will not get increased control over restricted operations, just the opposite, he will lose the ability to perform functions that were allowed by the MDM.

Figure 5A:
FIGS. 5A-5D are screen shots of adding restrictions in accordance with an embodiment of the current invention.
Figure 5B:
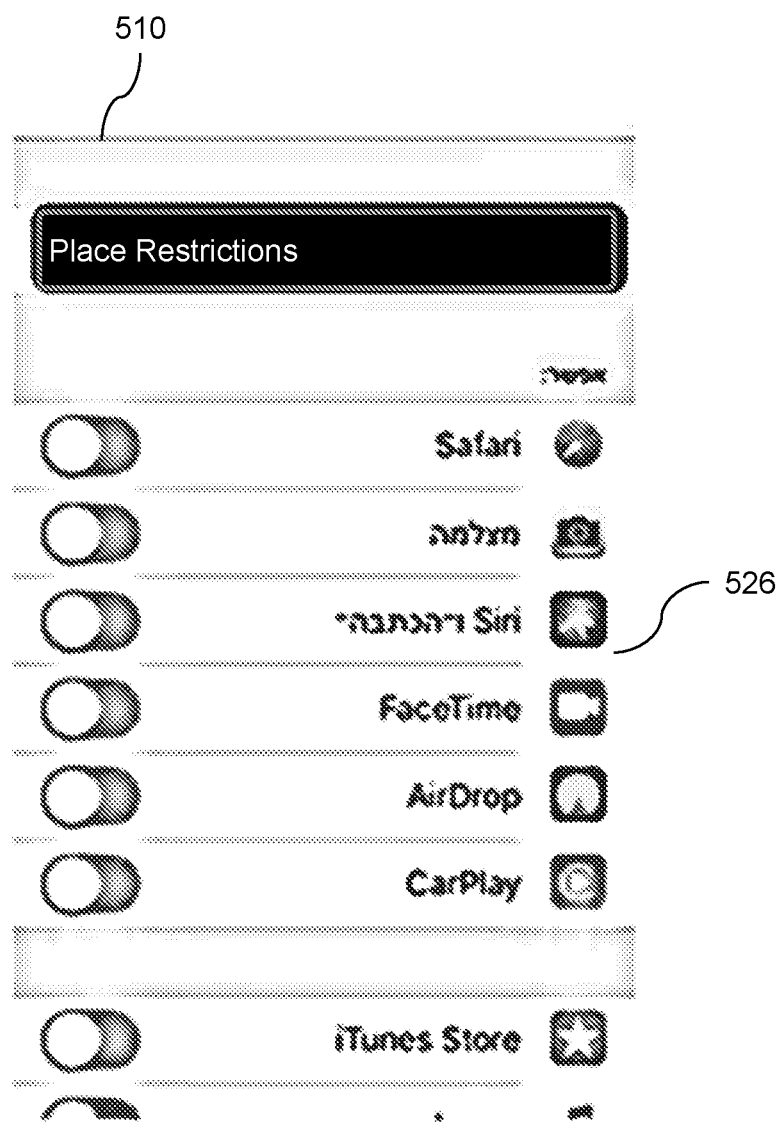
Figure 5C:
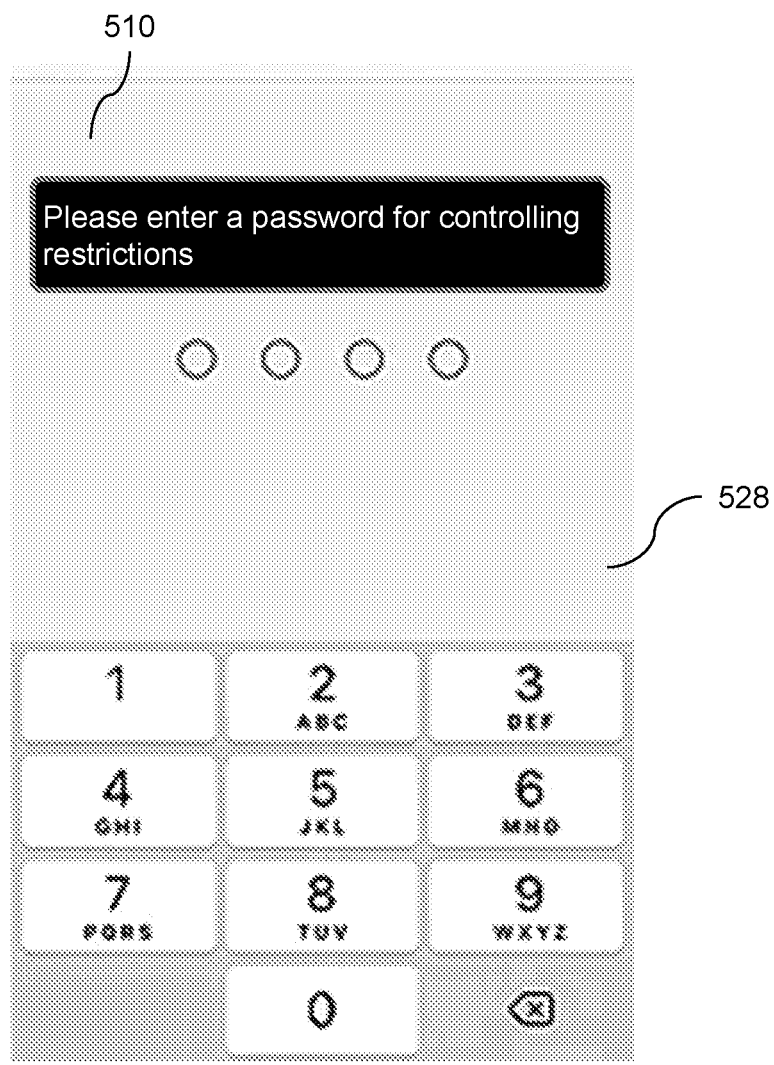
Figure 5D:
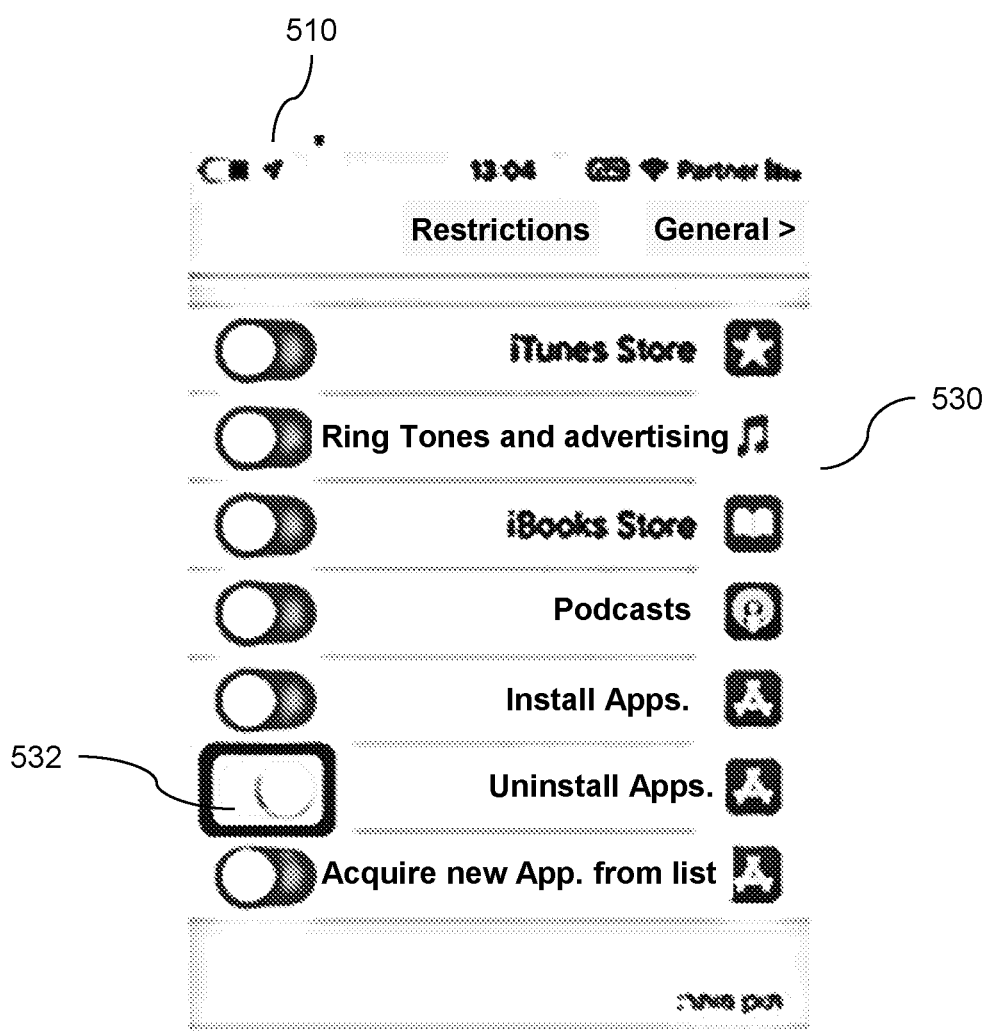

FIGS. 5A-5D are screen shots of adding restrictions in accordance with an embodiment of the current invention. In some embodiments, an installation application will direct an administrator to enter the restriction settings menu of his device 510. For example, the application (here labelled Netspark 506) will open an administrator management menu 526 of the device 510 and/or instruct the administrator to open the restriction management menu. For example, the device 510 may request 524 approval to change permissions from the administrator (e.g. as illustrated in FIG. 5A). After setting the protection password (for example as illustrated in FIG. 5C) access may be granted to change restrictions, the control application and/or the administrator may place various restrictions (e.g. uninstall restrictions 532 and/or an MDM profile and/or network access restrictions). For example, while the administrator is installing the system, the device may be placed into a restrictions menu 530 of a local device 510, for example as illustrated in FIG. 5D. Optionally the device 510 will set a security protection on the settings and/or restrictions. For example, in FIG. 5C an administrator sets a password 528. A local user who does not know the password will be prevented from changing the settings and/or performing protected functions locally without the password. Optionally, the control program will supply an interface to make limited through MDM. Optionally, during the setup of the system, the administrator prevents an unauthorized user from using the local device interface for removing 532 any programs from the device for example as illustrated in FIG. 5D.

Figure 6A:
FIG. 6A-6B Illustrate screen shots of removing an application from a limited network device by a local user in accordance with the current invention.
Figure 6B:
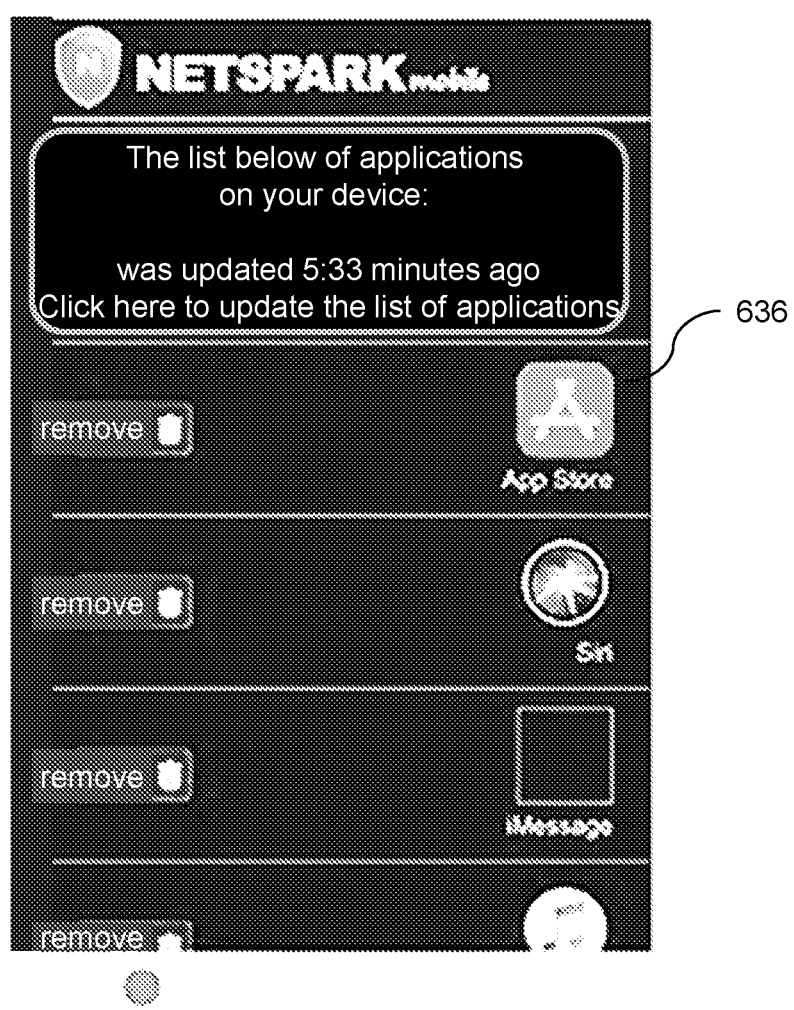

FIGS. 6A-6B are screen shot illustrations of removing applications by a local user in accordance with the current invention. For example, a user may be restricted from removing apps. using the local user interface of a device. In some embodiments, a control application 604 (for example in this case labelled NetSpark for example as illustrated on a home screen 634 of device 510 in FIG. 6A) may include an interface for performing restricted activities. Optionally, the user may employ the control application 604 to perform functions that have been restricted on the local interface. For example, the control application may instruct the MDM server to perform the restricted functions. In some embodiments, the control application will have separate icons for separate functions, for example there may be an icon for removing apps on the main screen of the device. The remove app. icon optionally calls up the remove menu 636 of the control program. For example, an exemplary remove program menu 636 is illustrated in FIG. 6B. Optionally, the control program will present to the user a list of applications that he is allowed to remove. Optionally, when the user chooses to remove an application, a message will be sent to the MDM server and/or to a propriety server. The MDM server and/or the proprietary server will optionally give the command to the local device to remove the requested program.

FIG. 7 is a flow chart illustration of a server selectively filtering devices on a network in accordance with an embodiment of the current invention. In some embodiments, a network server will receive 740 a request for connectivity from a device on a filtered network. Optionally, the server will grade 742 the device. For example, the grading 742 may be between devices that are candidates for aggressive filtering 744 and those that should have reduced 746 or no filtering. Alternatively or additionally, devices may be graded 742 into more than two categories. For each grade of device, a level of filtering and/or policy of what is allowed and/or how incoming data is handled.

In some embodiments, a network may include user devices such as personal computers, tablets and/or cell phones. The same network may include autonomous devices such as robotic vacuum cleaners and/or smart medical devices. In some embodiments, a content filter may open packets from and/or directed to a personal device and check for undesirable content (for example pornography and/or violence). For example, if a signed packet (e.g. SSL/TLS packet) is directed to the personal device, the network may open the packet, check its contents and then forward it to the device. In some cases, the repackaged data will contain a signature other than the original SSL/TLS signature (for example the original SSL/TLS signature may be from the original source of the packet and the forwarded packet may be signed by the server) (Note that herein the term SSL is used in a general way to include other forms of data protection and/or encryption/decryption e.g. TSL). In some cases, a device (e.g. a simple robot vacuum) will only accept data if it is signed by the original source (e.g. the maker of the robot). In some cases, a site may only accept signed packets from known devices. Optionally, a server grades 740 devices and opens SSL/TLS packets directed to a personal device (e.g. a compliant device) but does not open SSL/TLS packets of another device (e.g. a non-compliant device and/or a robot) as long as they come from and/or are directed to a reasonably safe source (e.g. from a source on a list of safe sources and/or from a source that is not on a list of unsafe sources). In some embodiments, devices will be graded 740 between local devices (for example in a home, personal devices belonging to family members) and guest devices (for example a cell phone brought by a guest and/or a robot that is not equipped to handle changes in traffic).

In some embodiments, local devices may signal to a server that they are local devices and pertinent to a local filtering policy. For example, in some embodiments, local devices have an application (e.g. a package included with the signaling application) that will recognize an SSL/TLS signature of the server. Optionally, the signal of the server will be used to sign resent packets after opening the original SSL/TLS packet. The local device will optionally accept the packet signed by the server. Alternatively or additionally, for devices that do not have the package installed (and/or do not signal) the server may not open SSL/TLS packets, avoiding the packets being rejected for an improper signature.

Figure 10:
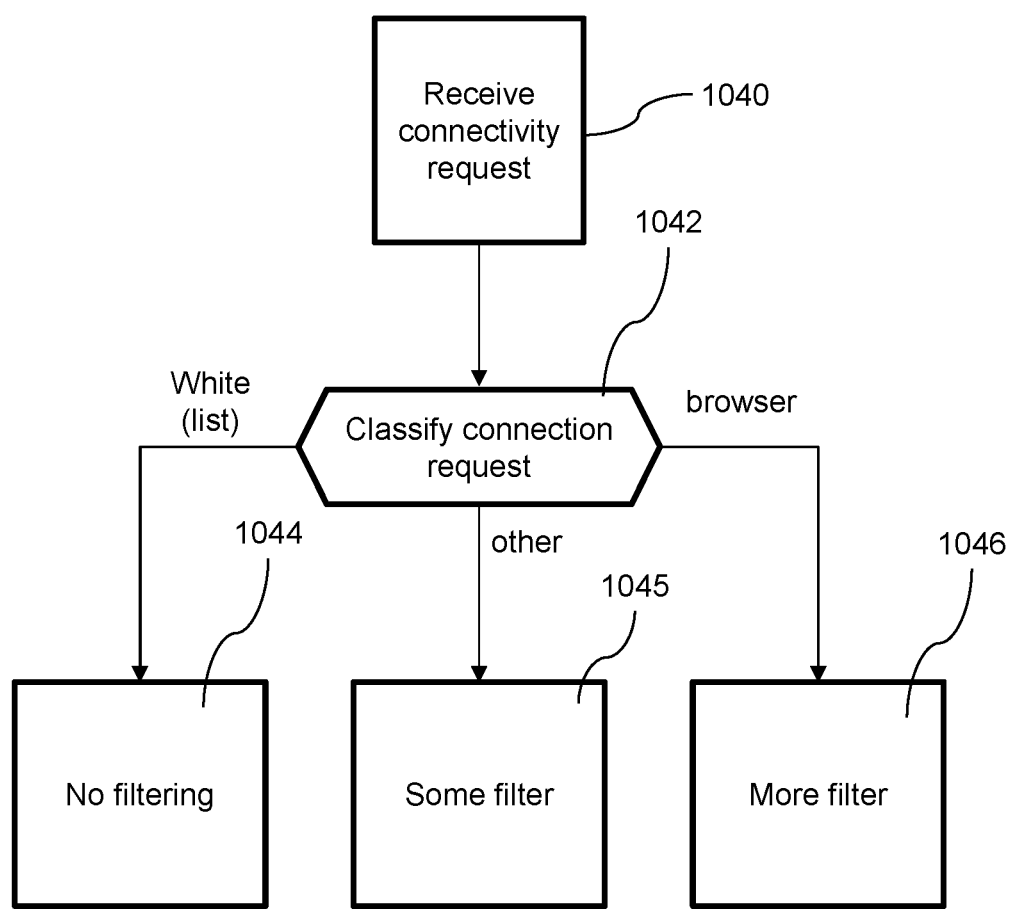
FIG. 10 is a flow chart illustration of a server selectively filtering connectivity requests on a network in accordance with an embodiment of the current invention.
Figure 11:
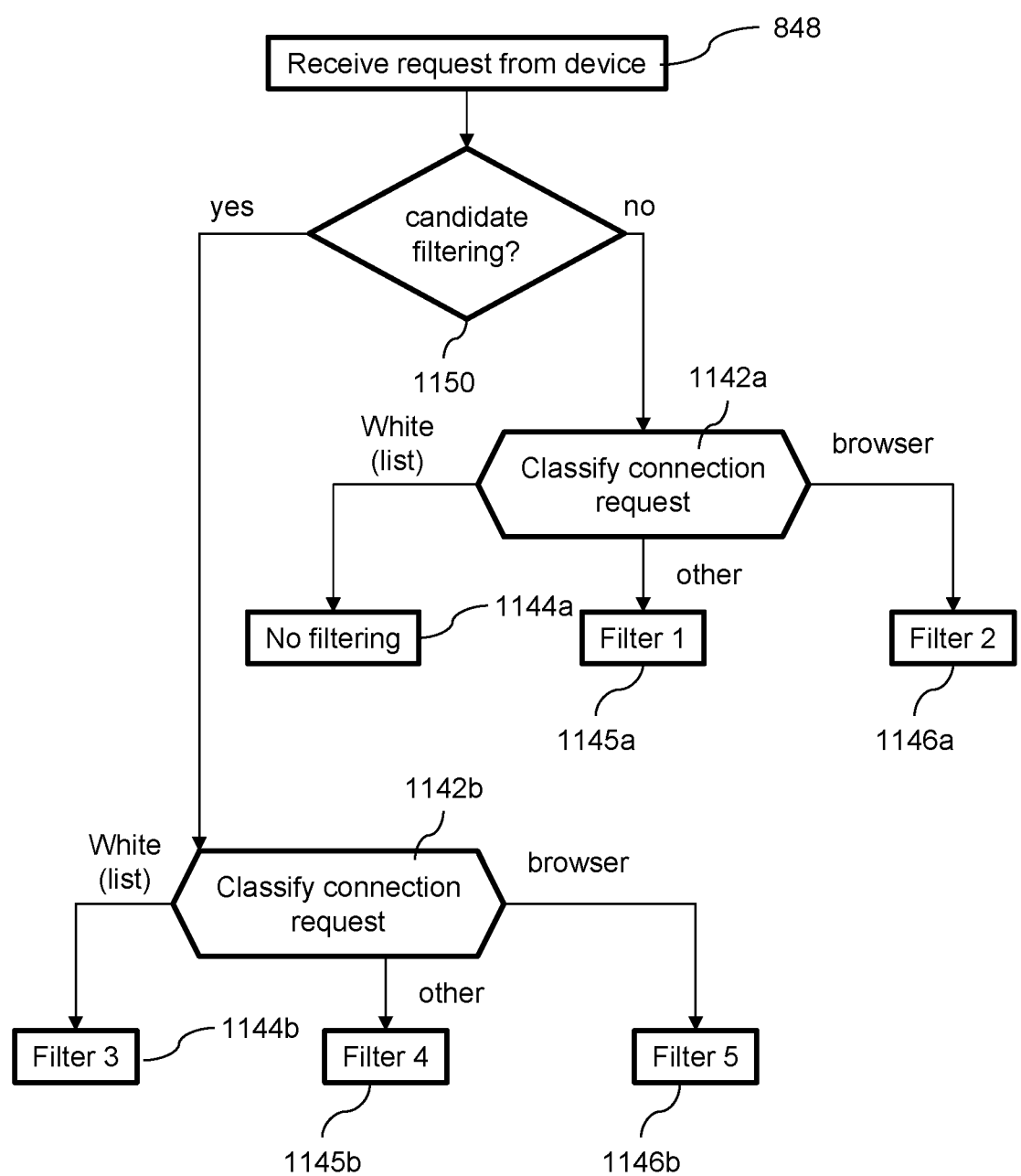
FIG. 11 is a flow chart illustration of a system selectively filtering connectivity requests on a network in accordance with an embodiment of the current invention.

In some embodiments, some devices may be left entirely without filtering. For example, a device that doesn't signal a readiness to be filtered may get direct access to the Internet. Alternatively or additionally, a device that doesn't signal readiness to be filtered may be filtered for certain requests and/or protected from some intrusive forms of filtering. For example, SSL packets may be delivered unopened except for when they come from blacklisted sites. Alternatively or additionally, SSL packets may be delivered unopened only when they come from white listed sites. Alternatively or additionally, connectivity requests various connectivity requests of a device not signaling readiness to be filtered may be filtered to different degrees for example as illustrated in FIGS. 10 and 11.

In some embodiments, a device signaling a willingness to be filtered may have its communication sent to a filtering server (for example a VPN server), and/or may be filtered according to a policy of the network (for example, all connectivity requests may be filtered and/or some connectivity requests may be filtered to different degrees for example as illustrated in FIGS. 10 to 14). Alternatively or additionally, all devices may get filtered, but, in some cases (e.g. for certain types of connectivity requests and/or white listed sites and/or some devices [e.g. devices not signaling readiness for filtering] etc.), the filtering may be less intrusive (for example SSL packets may be delivered undisturbed) while in other cases the filtering may be stricter.

Figure 8:
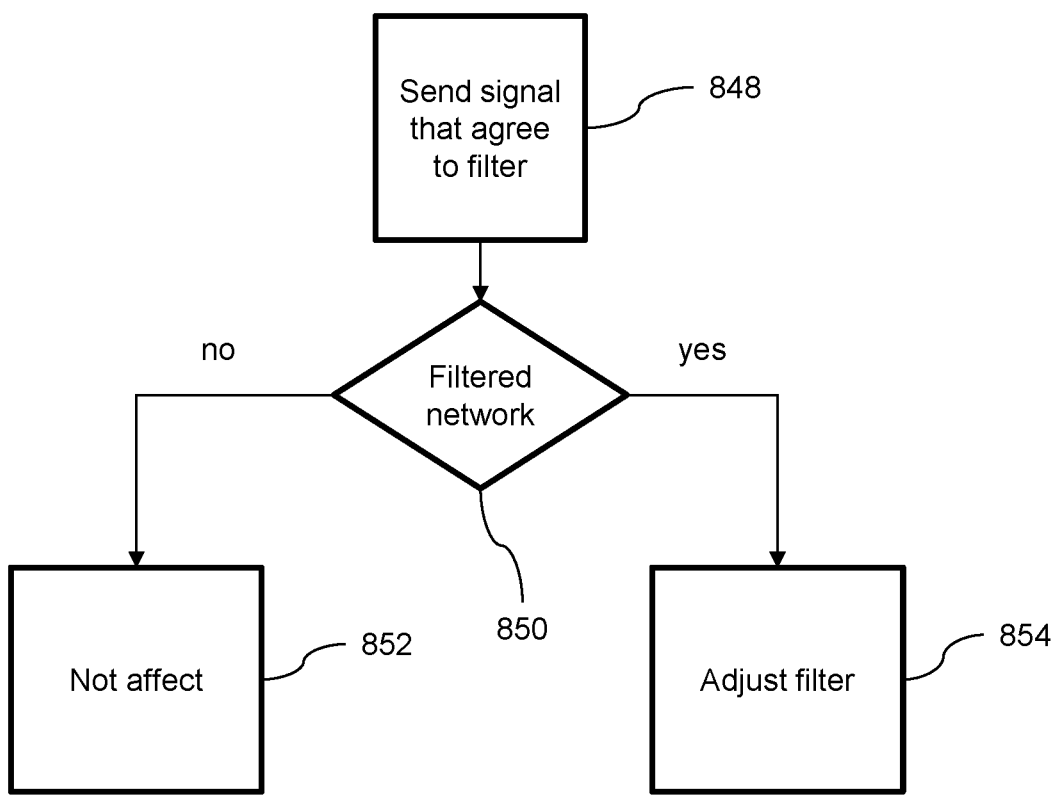
FIG. 8 is a flow chart illustration of a device signaling to a server that it is pertinent to filtering in accordance with an embodiment of the current invention.

FIG. 8 is a flow chart illustration of a device signaling to a server that it is pertinent to filtering in accordance with an embodiment of the current invention. In some embodiments, a signaling application (for example, application 904 FIG. 9) may be installed onto user devices (for example, device 910 FIG. 9) that are to be filtered under a particular policy. For example, the device may send 848 a signal that is detectable by a filtering server but will not interfere with service on other networks. For example, when 850 a mobile device is being used in a location served by the filtered service content will be filtered and/or adjusted 854 in accordance with the signal. When 850 the mobile device is in a location served by a non-filtered server, the signaling will not interfere 852 with service. Optionally, the signal may include data that defines details of filtering (e.g. a level of filtering and/or what subject matter to filter for this device).

In some embodiments a signal may be configured to be recognizable by a compliant server but to not interfere with traffic on a standard network e.g. with a server not configured to recognized the signal. For example, the signal may include a particular value in a little used field. For example, a signal may include an identifiable value in the DSCP field of a header (e.g. an IPv4 header). Alternatively or additionally, the signal may include an unusual division of data packets. For example, a value sent in a Transport Layer Security (TLS) handshake may be broken into two separate packets (for example 2 digits in one packet and/or 6 digits in a second packet) in such a way that the communication is legitimate but would not happen randomly (there is little reason and/or very little probability that such a small piece of data would be divided into multiple packets much less exactly two digits in one packet and the remain six digits in a separate packet). Optionally signaling may include redundant signals. For example, both the DSCP field and the TLS handshake may include a signal. For example, redundancy may reduce the probability that various factors may change the signal and/or make it un recognizable. For example, a filtering may be applied if either signal is found in the access request. Alternatively or additionally, multiple signals may be used to reduce the probability that a device that is not pertinent to filtering will be mistaken for a signaling device, for example, both signs may be necessary for the device to be recognized. Alternatively or additionally, multiple signals may be used to create multiple levels of filtering (for example a device having both signs may get more aggressive filtering than a device having only one sign).

Figure 9:
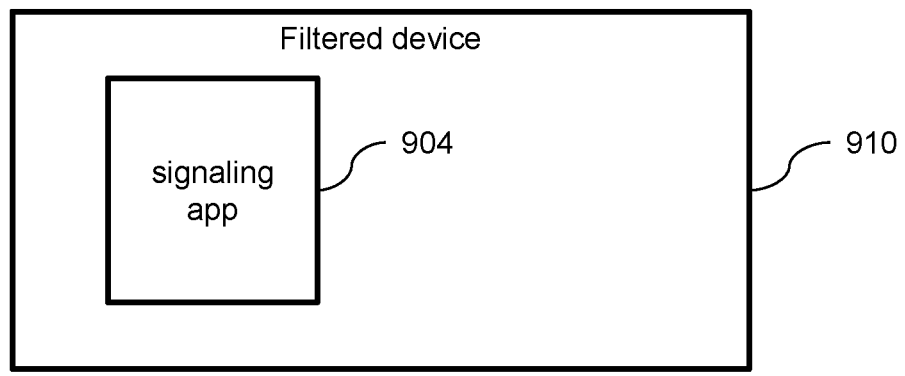
FIG. 9 is a flow chart illustration of a network device configured to signal a filtering status to a network server.

FIG. 9 is a block diagram illustration of a network device 910 configured to signal a filtering status to a network server. For example, a device 910 may have an application package 904 installed that signals for example as described above. The application package 904 may include other items such as a key for decrypting SSL/TLS signals from the filtering server. Alternatively or additionally, the application package 904 may include filtering software. For example, the local device may filter its own content (for example when it is not on a filtered network). Optionally the signaling application package 904 will be protected from unauthorized removal and/or disabling. In some embodiments, the signaling application package may include hardware (e.g. a dedicated circuit and/or memory) and/or software and/or firmware etc. In some embodiments, various functions of an application package 904 may be enabled and/or disabled in accordance to a preference of an administrator and/or payments to a filtering entity etc.

FIG. 10 is a flow chart illustration of a network server selectively filtering connectivity requests on a network in accordance with an embodiment of the current invention. In some embodiments, when a network server receives 1040 a connectivity request it will classify 1042 the request and/or the requester and deal with the request accordingly. For example, some requests may be delivered without disturbance 1044 (for example, for a device not indicating willingness to be filtered and/or for SSL connections and/or for connections to white listed sites and/or for requests which can be recognized according to their requesting applications). For example, connections to a bank and/or from a banking application may be allowed without disturbance 1044. Optionally, a request from a web browser and/or to an unrecognized site and/or from a device signaling a readiness to may be strictly filtered 1046. Optionally, for requests that are filtered, the network server may differentiate between requests from different applications (to the degree that that application can be known and/or discerned). For example, a request from a dedicated application (for example Waze and/or Google maps) may be checked against a black list of sites and/or non-SSL packets may be leniently filtered 1045, but SSL packets may be delivered untouched. For example, a request from other applications (for example web browser) may be more strictly filtered 1046 (for example even SSL packets may be opened and/or filtered). In some embodiments, the network server will differentiate between applications and/or connection requests based on data in an SSL hello and/or a handshake.

In some embodiments, the identity of a requesting application is revealed by a client application. For example, a client application is installed on a device increasing its compatibility with the filtering. The client application may send information about applications running on the device to the server. For example, the client may identify which socket belongs to which application and send that information to the server. For example, the client may send information to the server when an application opens a new communication. Alternatively or additionally, the identity of a requesting application may be discerned by analyzing an SSH client hello. Alternatively or additionally, the identity of a requesting application may be discerned by analyzing a user agent.

FIG. 11 is a flow chart illustration of a method of selectively filtering connectivity requests on a network in accordance with an embodiment of the current invention. In some embodiments, a level of filtering may depend on a multi-factor decision. For example, a server may analyze a request based on the device making the request (for example whether the device signals a readiness for filtering and/or based on some other parameter (for example as described in FIG. 7 and the accompanying description)) and/or the request may be filtered in accordance to characteristics of the request itself (to what address in the request directed, what application made the request, a time of day etc. (for example as described in FIG. 10 and the accompanying description)) and/or a historical and/or heuristic evaluation (for example as described in FIG. 12 and the accompanying description). The various categorizations and/or filtering modes may be related. A filtering mode for a certain type of request may be different depending on the device which makes the request.

In some embodiments, when a server receives 848 a request for access to a network it may try to discern 1150 the requesting device. For example, the device be discerned 1150 as a candidate for filtering based on a signal coded into the connectivity request, for example, as described in FIG. 7 and the accompanying description. Alternatively or additionally, a device may be discerned based on an identifying characteristic for example an IP address and/or a MAC number. Alternatively or additionally, a device may be judged based on an identifying characteristic and/or a history of the device (for example as described in FIG. 12). In some embodiments, there may be an identification of a device from an external source and/or a user may be notified under certain conditions whether a certain device (for example a new device that has not yet been identified on this network) should receive a special treatment. In some embodiments, a device may be identified and/or classified through signals other than a connection request, for example, a response to a beacon frame.

In some embodiments, after identifying the device, response to a request for connectivity may classified 1142a, 1142b based on the requesting device. For example, in some embodiments some devices may be given clear access to the Internet without any filtering (for example allowing dumb robotic devices to function without interference). Alternatively or additionally, a request from a device that does not signal a readiness for filtering may nevertheless be filtered. For example, when a request of connection is received 848 without a signal of readiness for filtering, the request may be classified 1142a. Some requests, (for example to a whitelisted site and/or to a not-blacklisted site and/or based on evidence (from the header and/or the size of the request and the size of the response etc.)) may be sent and their reply may be returned without interference 1144a. Optionally, some requests may be allowed with limited filtering 1145a (for example SSL packets may not be opened by other forms of filtering may be applied). Optionally, some request may be heavily filtered 1146a or denied (for example, requests to a black listed site) and/or SSL packets may be opened even for non-compliant devices. For example, if a request is recognized as coming from an Internet browser and/or is directed to a questionable site, it may be filtered even for a non-compliant device. For a compliant device and/or a device identified in another manner, filtering may be at a different level. Optionally, for a compliant device (for example, a device that sends a signal that it is ready for filtering) filtering may be according to the request. For example, for some packets there may be no or minimal filtering 1144b and/or SSL packets may not be opened (for example for communication with financial institutions and/or high security government sites) (the list of un-filtered sites may be the same and/or may differ from the whitelisted sites for a non-compliant device). Some requests, may be filtered 1145b at a medium level and/or some requests may undergo more strict filtering 1146b. Optionally, there may be more than two classifications of requesting devices and/or more or less than three different kinds of requests and/or the number of ways and/or level of filtering of different kinds of requests may be dependent of the classification of the requesting device. Optionally, some requests of some devices may be given direct access to the Internet. Other requests may be sent to a filtering server and/or filtered at various levels in accordance to a policy of the network owner, the device, etc. For example, the policy and/or level of filtering may be in accordance any of the embodiments described above.

Figure 14:
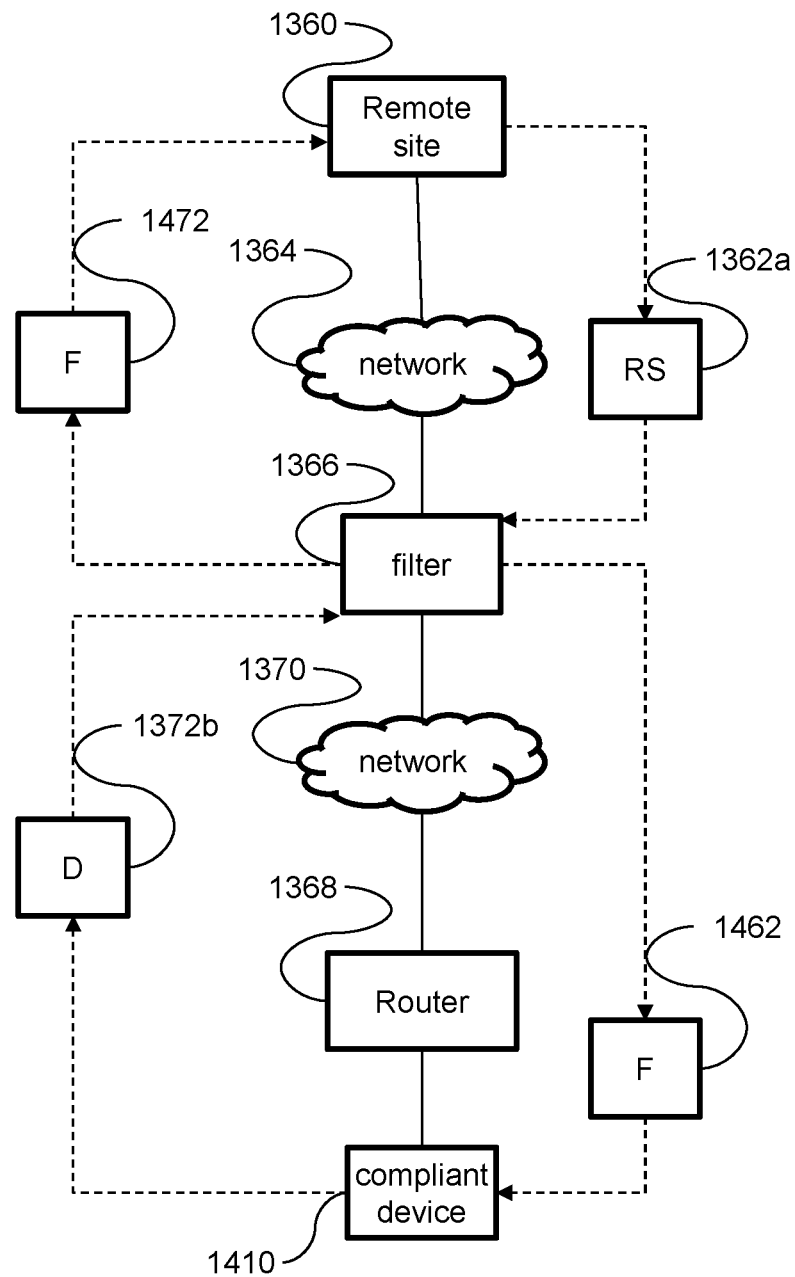
FIG. 14 illustrates a system monitoring behavior and/or adjusting filtering level in accordance with an embodiment of the current invention.

In some embodiments, a server may install its own certificate on a device and then encrypted packages may be intercepted and/or repackaged with the certificate of the server (for example as illustrated in FIG. 14).

Figure 12:
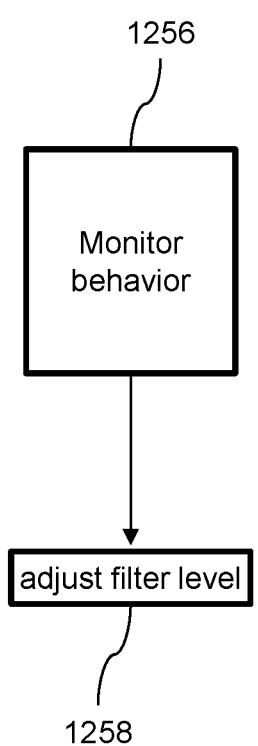
FIG. 12 is a flow chart illustrating heuristic filtering of connection requests in accordance with some embodiments of the invention.

FIG. 12 is a flow chart illustrating heuristic filtering of connection requests in accordance with some embodiments of the invention. For example, a server may monitor 1256 of devices making requests. For example, the server may monitor behavior based on IP address and/or MAC address and/or some identifying characteristic of packet headers. Based on the historical behavior of the device, the network may adjust 1258 filtering. For example, if a device ever makes a request from a browser application, then the device may be identified and/or filtered as a user device. If a device makes requests always to single address and/or at very regular time and/or if the device makes and receives only very small packets, then the device may be recognized as a dumb robot and/or filtered accordingly. Devices who tend to make requests during the day may be treated differently from devices that make requests around the clock and/or at night. In some cases, a server may keep a record of devices that sent a signal that they are compliant to filtering and continuing treating them as compliant even if the signal is not recognized in a particular packet. If a device sends a lot of similar SSL packets to a single target site, the server may sample the packets, allowing some to go through without opening, while opening and testing others. Based on the content of the opened packets, the server may choose to be more or less lenient with future packets.

Figure 13:
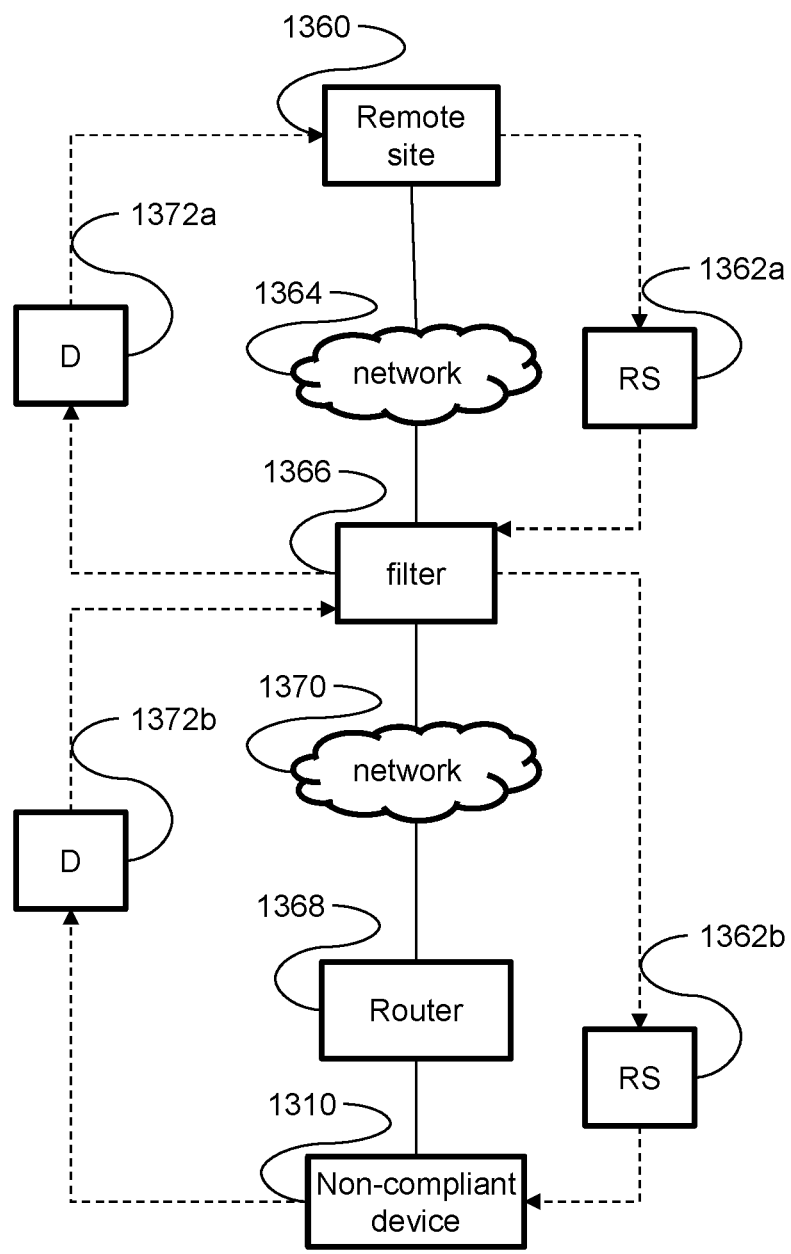
FIG. 13 illustrates a system monitoring behavior and/or adjusting filtering level in accordance with an embodiment of the current invention.

FIG. 13 illustrates a system monitoring behavior and/or adjusting filtering level in accordance with an embodiment of the current invention. Optionally, for some requests and/or for some devices a packet 1362a may be delivered unopened. For example, a non-compliant device 1310 (e.g. a device that does not signal a readiness to be filtered) may send a signed SSL packet 1372b to a remote site 1360. Optionally, a filtering server 1366 allows the packet 1372a to go unchanged to the remote site 1360. For example, the non-compliant device 1310 may be sent a signed SSL packet 1362a from the remote site 1360. The signed packet 1362a is optionally sent over a network 1364 (for example the Internet) through a filtering server 1366 (for example Internet Service Provider ISP and/or a filtering subscription server). The filtering server 1366 optionally sends the packet 1362b unopened (with the signature of remote site intact) to a local router 1368 (e.g. a local WIFI) which forwards the packet 1362b to the device 1310. Optionally, various wired and/or wireless connections may exist between links. For example, the filtering server 1366 may send the packet 1362b through a network 1370 to the router 1368 (e.g. network 1370 may include an ISP and/or a cable and/or a cellular network).

FIG. 14 illustrates a system monitoring behavior and/or adjusting filtering level in accordance with an embodiment of the current invention. Optionally, for some requests and/or for some devices a request packet 1372a and/or a response packet 1362a may be opened and/or filtered before delivery. For example, a compliant device 1410 (e.g. a device that signals a readiness to be filtered) may send a signed SSL packet 1372b to a remote site 1360. Filtering server may intercept the packet 1372b and deliver it to the remote site 1360 repackaged 1472 with a signature of the filter server 1366. Alternatively or additionally, the compliant device 1410 may give its secret keys to the server 1366 and the server may package and/or open data using the keys of the device 1410. For example, the compliant device 1410 may be sent a signed SSL packet 1362a from a remote site 1360. The filtering server optionally opens packet 1362a and check if the data is legitimate and/or permissible. After checking the data, filtering server optionally repackages the data. For example, the repackaged data may be delivered in a new packet 1462. Optionally the new packet 1462 has the signature of the filter server 1366. For example, an application on the compliant device 1410 may recognize the signature of the filtering server 1366 and accept the data packet 1462 without its original signature from the remote site 1360. In some embodiments (for example as described herein above) a filtering server may open packets and/or deliver unopened packets dependent on conditions of the request to which the packet is a response and/or dependent on the identity of the source and/or the destination and/or other factors for example as described above.

It is expected that during the life of a patent maturing from this application many relevant technologies will be developed and the scope of the terms used herein are intended to include all such new technologies a priori.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for providing different levels of filtering to different members of a network comprising:
   a processor;
   a memory; and
   a network server configured to
      receive a signal of a willingness to be filtered,
      provide a first level of filtering to a first member of the network upon receiving the signal of a willingness to be filtered from the first member, and
      provide a second level of filtering to a second member of the network from which the server did not receive the signal of a willingness to be filtered;
   a signaling module installed on the first member of said network, said module transmitting said signal to said network server;
   said second member of the network not including said signaling module, and wherein said network server is configured to open an SSL/TLS packet coming to said first member and to not open an SSL/TLS packet coming to said second member.

2. The system of claim 1, wherein said signaling module is configured for sending said signal in a manner that does not interrupt a standard network server.

3. The system of claim 2, wherein said signaling module is configured to send said signal via at least one method selected from the group consisting of including an identifiable value in a field of a packet header, including an identifiable value in a field of an IPV4 packet header, including an identifiable value in a DSCP field of a packet header, making a legal change in a communicated data and making a legal change in a handshake communicated data.

4. The system of claim 1, wherein said server is further configured to apply a different level of a filtering to different connection requests.

5. The system of claim 1, wherein said network server is configured for applying a higher level of a filtering to a first connection request from said first member and a lower level of filtering to a second connection request from said first member.

6. The system of claim 1, wherein said network server is configured for estimating a source of a connection request and selecting between a high and low level of filtering for said connection request in response to said estimating.

7. A system for providing different levels of filtering to different members of a network comprising: a processor; a memory; and
   a network server configured to
      receive a signal of a willingness to be filtered,
      provide a first level of filtering to a first member of the network upon receiving the signal of a willingness to be filtered from the first member, and provide a second level of filtering to a second member of the network from which the server did not receive the signal of a willingness to be filtered;
a signaling module installed on the first member of said network, said module transmitting said signal to said network server;
said second member of the network not including said signaling module,
wherein said network server is configured for estimating a source of a connection request and selecting between a high and low level of filtering for said connection request in response to said estimating,
wherein said network server is configured for determining that a first connection request is from a web browser and filtering a said first connection at a higher level and determining a second connection request is from a financial application and filtering second connection at a lower level and
wherein said network server is configured to open an SSL/TLS packet coming to said first member and to not open an SSL/TLS packet coming to said second member.

8. The system of claim 7, wherein said signaling module is configured for sending said signal in a manner that does not interrupt a standard network server.

9. The system of claim 8, wherein said signaling module is configured to send said signal via at least one method selected from the group consisting of including an identifiable value in a field of a packet header, including an identifiable value in a field of an IPv4 packet header, including an identifiable value in a DSCP field of a packet header, making a legal change in a communicated data and making a legal change in a handshake communicated data.

10. The system of claim 7, wherein said server is further configured to apply a different level of a filtering to different connection requests.

11. The system of claim 7, wherein said network server is configured for applying a higher level of a filtering to a first connection request from said first member and a lower level of filtering to a second connection request from said first member.

* * * * *